Nov. 25, 1924.　　　　　　　　　　　　　　　　1,517,150
E. R. DAHLSTRÖM
AUTOMATIC FEEDING DEVICE FOR TOBACCO AND SIMILAR SUBSTANCES
Filed Oct. 23, 1922
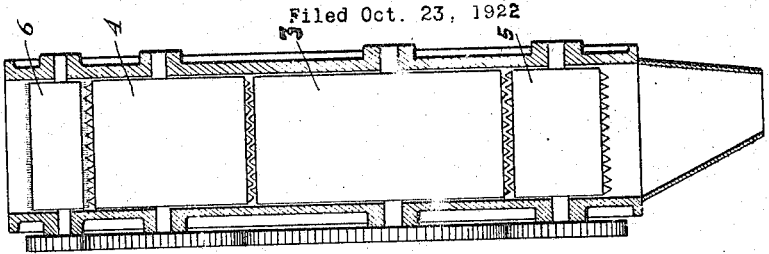
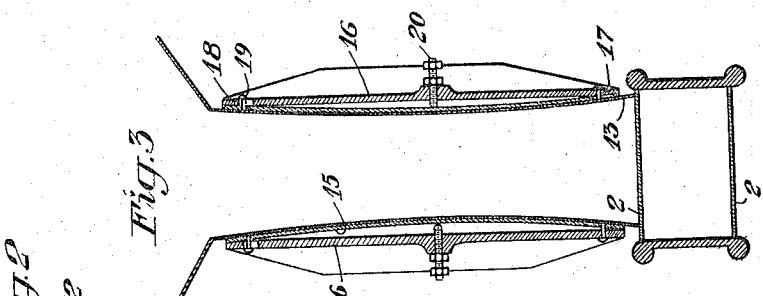
Inventor
E. R. Dahlström
by Marbury Clerk
Attys.

Patented Nov. 25, 1924.

1,517,150

UNITED STATES PATENT OFFICE.

ERNST RUBEN DAHLSTRÖM, OF STOCKHOLM, SWEDEN, ASSIGNOR TO AKTIEBOLAGET FORMATOR, OF STOCKHOLM, SWEDEN, A CORPORATION.

AUTOMATIC FEEDING DEVICE FOR TOBACCO AND SIMILAR SUBSTANCES.

Application filed October 23, 1922. Serial No. 596,438.

*To all whom it may concern:*

Be it known that I, ERNST RUBEN DAHLSTRÖM, engineer, a subject of the King of Sweden, residing at Vanadisvågen 34 III, Stockholm, Sweden, have invented certain new and useful Improvements in Automatic Feeding Devices for Tobacco and Similar Substances, of which the following is a specification.

Nowadays, modern tobacco manufacturing machines are provided with feeding devices which automatically feed the required quantity of tobacco to the working place proper within the machine.

Perhaps, the type of these automatic feeding devices most commonly used is the one represented by the construction shown in Fig. 1 of the accompanying drawing.

The tobacco is placed in the box 1 and is fed by the endless conveyor 2 toward the roller 3 which is provided with pointed pins or pegs all over its peripheral surface, said roller 3 being mounted obliquely above the one guide roller of the conveyor and adapted to rotate in the same direction as the latter, so that the parts of the conveyor and the roller 3 situated adjacent each other move in opposite directions. Mounted above the roller 3 is another roller 4 rotating in the same direction as roller 3, the said roller 4 being provided with pins or pegs which are shorter and more rounded than the pins of the roller 3. Through its rotation, the roller 3 catches a layer of tobacco at the side thereof forcing the mass of tobacco in the box, while the roller 4 sweeps off that quantity of tobacco of the said layer which is to be found outside the pins of roller 3. The layer of tobacco remaining on the roller 3, which corresponds exactly to the quantity of tobacco required, is then taken off from roller 3 by means of the roller 5 which is likewise provided with pins, and which rotates in a direction opposed to that of the roller 3, but at a much higher rate of speed and with the pins thereof engaging between the pins of roller 3. The brush 6 serves to keep the roller 4 clean from tobacco tending to stick to the roller so as to be carried around thereby.

The tobacco which, on its having been fed by the conveyor 2 toward the roller 3, is not caught by the latter, will nevertheless, by the rotation of the roller 3, attain a movement upwards in the direction of the arrow 7, whereupon the said tobacco is driven backwards by the rotation of the roller 4, as indicated by the arrow 21, and falls down into the rear part of the box 1. Then it is again fed by means of the conveyor 2 toward the roller 3, the part of the tobacco which is neither at this time caught by the roller 3 being again circulated as above described, which cycle of operations is repeated as long as tobacco is being supplied to the box.

It is this circulating movement of the tobacco which constitutes the most prominent feature in the operation of the automatic feeding device. If the tobacco would stop against the roller 3 so as not to move further upwards, it will pack in this place so that, finally, no tobacco will be found in the path of the teeth of the roller, which latter will thus run idle. But it is not only this circumstance which must be carefully watched, it being also necessary that the circulating movement of the tobacco takes place in such a manner and with such a force that the proper pressure will be exerted by the tobacco material in the box against the roller 3.

The automatic feeding device heretofore used have been made of wood, usually mahogany, the said devices having been shaped on the inside in such a manner that a natural release of the tobacco in its movement has been attained. The narrowest portion of the box is about the point 8 forming, so to say, the center of the circulating movement, the box widening in a certain way from this center toward the sides. Moreover, the side pieces of the box are not rigidly secured to the front portion 9 of the automatic machine, the same being adjustable in such a manner that the box may be screwed together or widened respectively at the front.

The said bulging of the inner sides of the box is a most troublesome and difficult task which is performed more or less manually on patterns and the like determined by laborious experimentation. The shape cannot, however, be adapted to any particular sort of tobacco, the same having to be made so as to suit all sorts as far as possible. This involves a great disadvantage which it is the object of the present invention to remove.

The invention is principally characterized by the box being provided with resilient or elastic side walls which may be easily bulged, more or less, according to the requirements.

An arrangement of the invention is illustrated in the accompanying drawing. Fig. 1 is an elevation of the device with one lateral wall removed, parts being shown in section. Fig. 2 represents a detail, and Fig. 3 is a section of the box on line III—III in Fig. 1. Fig. 4 is a section on line A—A.

According to the embodiment shown, the side walls 13 of the box, as also the remaining portions of the box, are made of steel plate or any other suitable metallic material, the box being further provided with devices to facilitate bulging of the plate walls to the desired extent, and to render possible a control of the width of the box at the upper front portion 9 of the circulating room for the tobacco material.

For the first-named purpose there is provided a set screw 20 right in front of the point 8 corresponding to the center of the said circulating movement, the said screw being screwed into a comparatively sturdy vertical angle-iron or the like 16, the one end 17 of which is rigidly attached to the wall 13 while its other end is movably connected with the wall, the hole of the angle-iron 16 for the attaching bolt 19 being oblong in the longitudinal direction of the iron.

Bearing against the plate wall opposite to the angle-iron 16 is a leaf spring 15 shaped approximately in conformity with the said angle-iron. The leaf spring 15 is attached with its ends to the plate wall by means of the same bolts or the like which connect the angle-iron 16 with the plate wall. The leaf spring has for its purpose to support the plate wall so that the bulge will be even and uniform. It has namely been found that if such a spring is wanting, buckles will easily occur in the plate wall, especially opposite the screw 20, whereby the uniform circulating movement of the tobacco in the box will evidently be counteracted to a great extent. Obviously, a number of springs of the said kind may be used, if desired.

It will be readily understood from the above that by screwing the screw 20 bearing with its inner end against the spring 15 inwardly or outwardly, it will be possible to regulate the degree of bulging of the plate wall within certain limits, that is to say, the box may be adjusted so as to be suited to different kinds of tobacco or to different moisture contents of the tobacco etc. Thus the side walls of the box may be made plane from the beginning, so that the expensive work involved by the bulging of the walls, which is required in the arrangement heretofore known, is entirely avoided.

The device serving to facilitate a control of the width of the box at the front is shown in Figs. 1 and 2. Projecting from the frame 10 of the machine is a bracket 11 having screwed therein a screw 12 provided with a nut lock. Attached to the wall 13 of the box is a plate or the like 14 into which the screw engages in such a manner as to be freely rotatable therein, while the said plate is brought along with the screw on the latter moving in the longitudinal direction. By turning the screw, the wall of the box may thus be displaced toward or from the bracket, whereby the tobacco box is expanded or reduced with respect to the width thereof at the front, such expansion and contraction taking place chiefly at the top, as at 9, while occurring successively less in a downwards direction.

Thus, if the said width of the box is reduced, the progress of the tobacco on its way up toward 9 (Fig. 1) is impeded, whereas conditions will be reversed in case of the width of the box being widened. In the first instance the tobacco will be packed harder in front of the roller 3, while in the second instance such packing will be looser.

In addition to the present box construction being inexpensive to manufacture and facilitating adjustment for different kinds of tobacco, it is insusceptible of the moisture content of the air, which is of a very great importance, but is not attainable as far as desirable in the known wooden boxes.

Obviously, the arrangement above described may be modified in a number of ways, without the scope or the spirit of the invention being departed from. For example, only the one side wall may be made resilient in the manner indicated, while the other wall is as usually made of wood.

What I claim as new and desire to secure by Letters Patent of the United States of America is:—

1. A feeding device for cut tobacco and similar substances, consisting of a box for receiving the tobacco, a roller in said box, said roller being adapted to catch the tobacco and to feed it out in uniform quantities, said box including a wall disposed substantially perpendicular to the axis of the roller and being resilient, and means for adjusting said wall to a more or less bulged shape.

2. A feeding device for cut tobacco and similar substances, consisting of a box for receiving the tobacco, rollers in said box, said rollers being adapted to catch the tobacco and to feed it out in uniform quantities said box including two opposite resilient walls disposed perpendicular to the axes of the rollers, and means for adjusting said walls to a more or less bulged shape.

3. A feeding device for cut tobacco and similar substances, consisting of a box for receiving the tobacco, rollers in said box, said rollers being adapted to catch the tobacco and to feed it out in uniform quantities, said box including two opposite walls disposed perpendicularly to the axes of the rollers, being formed of resilient steel plates, and being bulged inwardly.

4. A feeding device for cut tobacco and similar substances, consisting of a box for receiving the tobacco, a roller in said box, said roller being adapted to catch the tobacco and to feed it out in uniform quantities, said box including a wall disposed substantially perpendicular to the axis of the roller and being resilient, and means for adjusting said wall to a more or less bulged shape, said means consisting of a member, a screw mounted in said member, said member being disposed on the one side of the wall and said screw being adapted when rotated to adjust the wall to the desired bulged position.

5. A feeding device for cut tobacco and similar substances, consisting of a box for receiving the tobacco, a roller in said box, said roller being adapted to catch the tobacco and to feed it out in uniform quantities, said box including a resilient wall disposed substantially perpendicular to the axis of the roller, and means for adjusting said resilient wall to a more or less bulged shape, said means consisting of a beam, a set screw mounted at the middle part of said beam, said beam extending vertically along the wall and being attached with its ends to the top and bottom portion thereof.

6. A feeding device for cut tobacco and similar substances, consisting of a box for receiving the tobacco, a roller in said box, said roller being adapted to catch the tobacco and to feed it out in uniform quantities, said box including a resilient wall disposed substantially perpendicular to the axis of the roller, and means for adjusting said resilient wall to a more or less bulged shape, said means consisting of a beam, a set screw mounted at the middle part of said beam, said beam being attached to the box and extending vertically along the outside of the wall, the one end of said beam being movably attached to the box.

7. A feeding device for cut tobacco and similar substances, consisting of a box for receiving the tobacco, a roller in said box, said roller being adapted to catch the tobacco and to feed it out in uniform quantities, said box including a resilient wall substantially perpendicular to the axis of the roller, and means for adjusting said wall to a more or less bulged shape, a spring arranged to impart rigidity to the wall.

8. A feeding device for cut tobacco and similar substances, consisting of a box for receiving the tobacco, a roller in said box, said roller being adapted to catch the tobacco and to feed it out in uniform quantities, said box including a resilient wall substantially perpendicular to the axis of the roller, and means for adjusting said wall to a more or less bulged shape, a flat spring arranged vertically along the one side of the wall.

9. A feeding device for cut tobacco and similar substances, consisting of a box for receiving the tobacco, a roller in said box, said roller being adapted to catch the tobacco and to feed it out in uniform quantities, said box including a resilient wall substantially perpendicular to the axis of the roller, and means for adjusting said wall to a more or less bulged shape, said means consisting of a beam, a set screw mounted at the middle part of said beam, the latter extending vertically along the wall and attached with its ends to the top and bottom portions thereof, a spring inserted between the said resilient wall and the said beam.

In testimony whereof I affix my signature in presence of two witnesses.

ERNST RUBEN DAHLSTRÖM.

Witnesses:
 L. BERG v. LINDE,
 ERIC HOLGER.